(12) United States Patent
Shum (10) Patent No.: US 6,966,031 B1
(45) Date of Patent: Nov. 15, 2005

(54) METHOD OF ORGANIZING AND ACCESSING CHINESE WORDS

(76) Inventor: Hai Shum, 131 Maynard St., San Francisco, CA (US) 94112

( * ) Notice: Subject to any disclaimer, the term of this patent is extended or adjusted under 35 U.S.C. 154(b) by 605 days.

(21) Appl. No.: 09/901,961

(22) Filed: Jul. 10, 2001

(51) Int. Cl.[7] .................. G06F 15/00; G06F 17/00; G06F 7/00
(52) U.S. Cl. .............. 715/536; 715/534; 715/535; 715/539; 707/3; 707/101; 707/102; 707/103; 707/104
(58) Field of Search ................ 715/536, 532, 715/530, 531

(56) References Cited

U.S. PATENT DOCUMENTS

| | | | |
|---|---|---|---|
| 4,951,033 A | | 8/1990 | Sakaguchi ............... 345/160 |
| 5,559,693 A | * | 9/1996 | Anick et al. ................ 704/9 |
| 5,704,060 A | * | 12/1997 | Del Monte ............ 707/104.1 |
| 5,930,788 A | * | 7/1999 | Wical ...................... 707/5 |
| 5,963,671 A | * | 10/1999 | Comerford et al. ........ 382/230 |
| 6,122,647 A | * | 9/2000 | Horowitz et al. .......... 715/513 |
| 6,154,213 A | * | 11/2000 | Rennison et al. .......... 345/854 |
| 6,212,530 B1 | * | 4/2001 | Kadlec ................... 707/201 |
| 6,295,542 B1 | * | 9/2001 | Corbin ................... 715/501.1 |
| 6,327,593 B1 | * | 12/2001 | Goiffon .................. 707/102 |
| 6,370,497 B1 | * | 4/2002 | Knowles ................... 704/1 |
| 6,510,406 B1 | * | 1/2003 | Marchisio ................. 704/9 |

FOREIGN PATENT DOCUMENTS

CN    1034075 A    7/1989

OTHER PUBLICATIONS

Simpson, Alan; Mastering WordPerfect 5.1 & 5.2 for Windows; Sybex, Inc; pp 154-161.*

* cited by examiner

*Primary Examiner*—William Bashore
*Assistant Examiner*—N Hillery (57) ABSTRACT

A method and system of organizing and accessing Chinese words comprises word storage structures having words indexed by the meanings, by the radicals, by the strokes and by the usage frequency thereof; said storage structures separating the traditional form words and the simplified form words; said storage structures having reference linkage for the two forms; said storage structures using multiple listing for common words; said storage structures having mechanism for relocating words; said method and system utilizing existing regular computer components, utilizing existing Chinese operating systems and word processing programs.

3 Claims, 5 Drawing Sheets

METHOD OF ORGANIZING AND ACCESSING CHINESE WORDS

BACKGROUND OF THE INVENTION

1. Technical Field

This invention relates to a method for entering Chinese words into a modern computer, and more particulary for accessing Chinese words into a computer with a Chinese language operating system installed.

2. Background Art

Chinese language is completely different from English. Typewriting Chinese words into a modern computer equipped with an English keyboard was not possible until about twenty years ago. Since then, nearly a thousand inventions to solve this challenging task have patented world wide. Among these inventions, the majority is the kind that adapted the concept of English typing, using the alphabet keys of the keyboard spells out the Latin spelling of Chinese words, or using the keys, each of which is assigned with a few strokes and a few radicals, re-assemble the words from these strokes and radicals.

These methods are currently utilized. However, they have limitations from their origin. For the people, whose first accent is Mandaring or accents similar to Mandarin; the Latin spelling methods do not require a serious training. Due to the fact that many words share similar spelling, to be able to pronounce the words precisely is required before conducting the typing task.

It is known that a same spelling usually stands for numerous words, which are completely different in their meanings, as well as in their appearances; these same pronunciation words are distinguished from each other by the four tones. And more difficult is that a same tone of the same pronunciation represents multiple words in various meanings. To compensate this, to identify the desired word, a list of these words related to the same spelling is shown in a small window, the typist is required to tap in a number associates with the word to select it. This selecting process reduces the speed of typing. The typist has to try a few attempts to find the target word. For the people, who are not familiar with the standard Mandaring, this spelling method often becomes a mission impossible.

Currently, the majority of professional typists uses the stroke methods, which typewrite the strokes and radicals as components to rebuild words. Or, assigning words with four digit numeral codes, re-assemble words while typing these codes.

It is necessary to point out that the English words are assembled by uniformed alphabets, in a horizontal continuance matter. The Chinese words are two dimentionally assembled by strokes. There are no standard length, no standard angle for the strokes. Each word is irregularly tailored. Each single Chinese word can be willingly dismantled into a few different sets of strokes. Each single word can be seen as a combination of a few different sets of strokes.

Typists have to memorize the orders of the assembly of all the words. After a period of very serious training, professional typists are able to input Chinese words in high speed. The typing task is stressful. Furthermore, Chinese word structures are different between the traditional form and the simplified form. These stroke methods are based on the structure of the words. One stroke method can only work for one form of Chinese language. That gives limitation from their origin. People, who is familiar with Chinese language, who is knowledgeable in computer, but still unable to typewrite, unwilling to learn typing is a common phenomenon. Many intellectuals still keep hand writing. These input methods are not profound strategic solutions.

Each Chinese word is a unique piece of art. To keep its integrity has been demanded for generations.

There are some inventions patented to input the integral Chinese words, using the cursor to select the words from a list displayed on a device. This method shared a common requirement with the methods described above to have an internal Chinese vocabulary in storage. Instead of match each typed set of Latin spelling or set of strokes/radicals/codes to match the internal storaged word, this method copies words directly from the word display to the word processor. In addition, these methods substantially reduced the dependence of the English keyboard.

Among the inventions of this kind, a patent issued by China to HouYi-bin and Feng xiu-zen, in July 1989, application number 88103689.7, title: 'Method of Inputting Chinese Words to Computer by Selecting Words on Screen', is the first one to use the technic of selecting items on screen with the pointing device to enter Chinese words to a computer; disclosed the usage of floading windows carrying Chinese words on a Chinese operating system platform; mentioned using radicals for word group indexing, displaying all the radicals found in the <<New Chinese Dictionary>> on screen, selecting the radical leading to the desired word to having all the words under that radical displaying on screen in a second window. As broadly known by all, radicals are the roots of words, one radical possibly stands for a few hundreds of words or only a few. Without dividing words into level of using frequency, searching words will not be easier. Another shortcoming is that it does not utilize the existing keyboard.

An U.S. Pat. No. 4,951,033, issued in Aug. 1990 to Sakaguchi, describes a system and method to input integral words; was applied in 1987, a continuation of the application of 1984, when the modern word processor wasn't available, at the time a personal computer had small internal memory; Sakaguchi created 20 word groups, each carry 8 words, which is not sufficient for normal practical use; didn't reveal a method of organizing and searching a large volume of words.

Microsoft's program "Word Perfect"; a publication by Alan Simpson, 'Mastering WordPerfect' has a step by step, clear description of selecting a word or a symbol from a window having as much as 1400 items. But, it has no disclosure of mechanism for larger volume of words. An U.S. patent issued to Rennison et al. in November 2000, U.S. Pat. No. 6,154,213, offers a effective word searching method that is feasible. It mentioned using "frequency thresholds" to classify words, but no disclosure of the levels of the thresholds, no disclosure the number of the thresholds, no disclosure of a formular to determine the thresholds. It gave a concept of using hierarchy for storing words, but has no disclosure a detail of the organization of the words. It gave examples of word searching, such as using "dog" to find "wolf"; but has no disclosure an actual searching path from the word "dog" to the word "wolf", has no disclosure of the linguistic relation between words for practical use.

For a language with ten thousand words, as in Chinese, an efficient word organizing and searching method is the key principle of a succesful typing program.

These previous inventions described few details of the arrangement of the Chinese words in storage, described no details of an efficient word search method. That explains the reason of the vacancy of real usage of the inventions of this kind at the present time. Until now, there is no such method available for practical use.

The scope of these previous inventions is limited, they have been inspired solely by the available technology. This is the field where technology merges with language and culture. These innovations will be greater, if language knowledge and cultural background come along, endeavor together.

It is necessary to point out that commingling the simplified Chinese words with the traditional Chinese words in writing is prohibitted by law. However, even the head of the state often makes such mistakes, only those linguistic scholars are able to distinguish them. Inventions of this kind should provide a mechanism to separate these two forms clearly, but provide a mechanism to refer them conveniently.

Based on the rapid advanced information technology of the last decade, many miraculous computing tasks have become daily reality. An effective, speedy search method of the Chinese vocabulary is a constant, perpetual demand. The Chinese language has thousands words, each word is not an idle item. Each word has meaning, is a dynamic vigorous unit of art. To list them intelligently, to locate them easily, to select them conveniently, to copy them to the word processor quickly and correctly is a challenging task. Carrying this ancient language to meet demands of 21st century, is an assignment for us to endeavor.

This invention synthesizes the culture with the language and technology, inherits the great inspiration of the prior arts, creats an effective word organizing and searching method, makes the challenging task of Chinese word searching and typing becoming an enjoyable journey. At this stand point, the present invention offers an innovative permanent solution.

SUMMARY

The present invention is aimed to solve the problems mentioned above.

The primary objective of this present invention is to maintain the integrity of the Chinese language. Words are not dismantled into strokes, nor spelled by alphabets. Each word is displayed and entered as a complete integral unit. The meanings of words and radicals are used as leads and indexes for organizing and searching.

The main objective of this present invention is to creat a typewriting method that does not require training. A person with minimum knowledge of computer and capable to read, to write Chinese language is able to typewrite Chinese words using this method offered by this invention, with complete accuracy at the virgin attempt. The pace of typing increases as the typing tasks progress.

The traditional way to search a word in a Chinese dictionary is following the orders of the orthodox radicals. It is often a very hectic process. Some words have multiple radicals, and some words have hidden radicals, some words have implicit radicals and some words have conjectural ambiguous radicals. Some words have multiple meanings.

In a Chinese dictionary, a word appears only once as a principle of a dictionary, despite the extreme difficulty of finding it. A few attempts of trying different radicals is often needed before locating a word or even finding unsuccessfully. This orthodox radical word arrangement principle has restrained the broad use of the traditional Chinese dictionary. Simply adapting it to the vocabulary arrangement for word processing is not wise.

The present invention offers an important objective to arranging the words principally from the meaning thereof, the radical order is secondary. Words also filled into pages according to the shape and the dominant stroke thereof. Under this word classifying principle, frequently used words and 'hard to find' words have opportunity to be listed into multiple pages, greatly reducing word searching time.

Words are listed under the meaning thereof, following the thinking of the typist, a string of words naturally appear on screen in sequence as the typing in progress. A feature is added to have additional blank space in pages for encouraging the user to fill in additional words conveniently for easy locating. Another feature is also added to have words to be relocated or exchanged to pages that are convenient for the typist.

Until the present time, inventions of this class/sub-class, have become practically use are all adapted the concept of English typing, heavily depend on the English keyboard. It is another objective of this invention to minimize the dependence of the keyboard. There is another beneficial objective of the invention to be completely independent from the Chinese word pronuciation, users from different region with different dialect/accent background have an equal opportunity to utilize this method. Furthermore, there are no requirement of memorizing any long set of codes.

There is an additional objective of the present invention. The traditional form and the simplified form of Chinese words are stored in two separated divisions, an user has no fear to type a wrong form of word in a formal written communication. However, these two forms of words exist within same program offered by this invention. It takes only a click on the pointing device or a tap on the keyboard to switch from one to another. It is convenient for the typist to typewrite an article having these both forms of words in some occations.

It may be worthy to mention that with both forms of Chinese words in storage, the traditional and the simplified, easily switching between them; the user may use it as a reference for interpretting. It is broadly known that the radicals are the roots of the Chinese words, as mentioned above, words grouped together according to thier logical meaning, thier social or scientific classes; this invention offers a good referencing study material for the user to be more familiar with the language.

DETAILED DESCRIPTION OF THE INVENTION

The present invention organizes all available Chinese words into two storage structures, the traditional and the simplified. The two structures are in a three dimensional format, parallelly collocated, consisting three vocabulary tiers. Each tier has 26 pages for 26 word groups. Each page is divided into a plurality of cells, each cell is occupied by one word. Each cell is assigned with an individualized address. For the reason that the traditional structure and the simplified structure are symmetrical, each cell with its occupant and the associating address in a structure is correspondingly the equivalent to the same cell same occupant and same address in the opposite structure.

Figure 1:
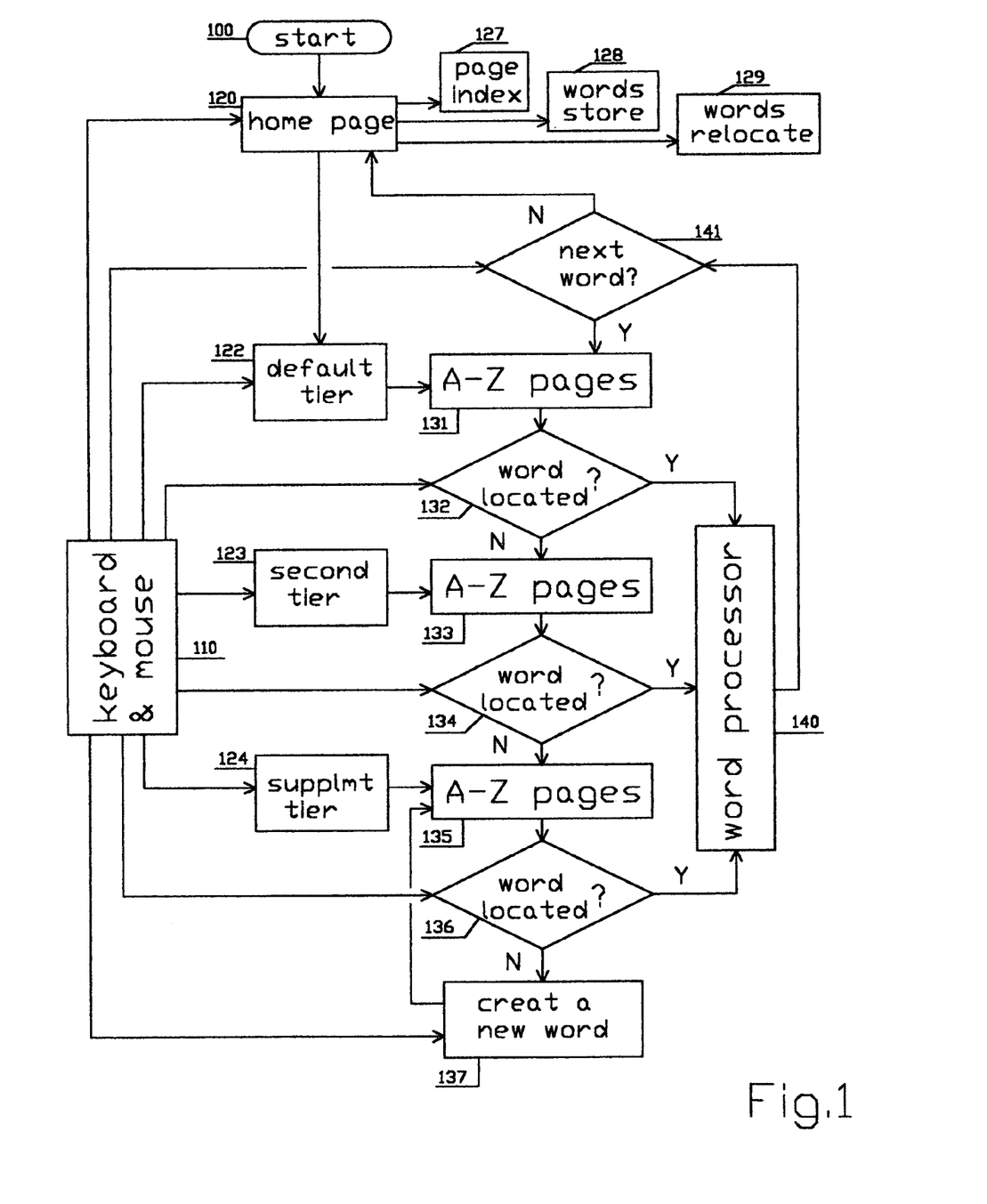
FIG. 1 the flow chart of locating and entering a word.

FIG. 1, illustrates a word locating and selecting flow chart, describing the relationship between the tiers, the relationship between the pages and the relationship between a tier with the subordinate pages thereof, describing a typical process of searching, locating and selecting a word. As mentioned above, the two structures are identical in their format. One flow chart explains the relationship and the process for both structures.

The step 100 marks the start, introduces the home page 120. Commands are sent from the interface devices, the keyboard and the pointing device(mouse) 110.

Figure 3:
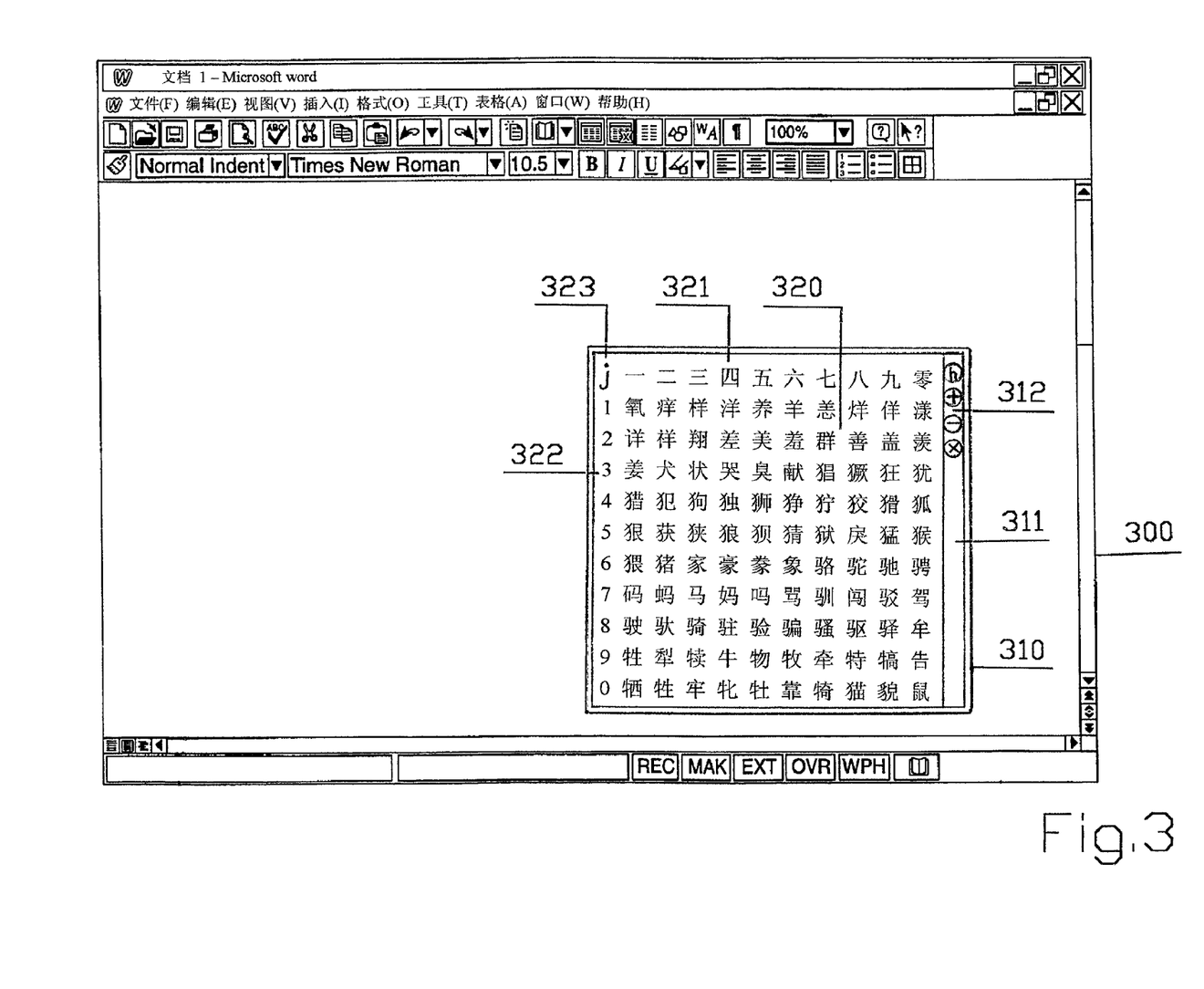
FIG. 3, a typical display of a word page.

The description of steps 120, the home page, is given in FIG. 3.

Unless the user selects other tiers, the program defaults to the primary tier 122, where contains the most frequently used words. Pages are indexed with alphabet letters on the keyboard, as one of the efforts of this invention to use existing equipment. From a to z, use the lower case, for the simplified form Chinese words; use the upper capital case A to Z for the traditional form Chinese words. On the primary and secondary tiers, each page has 100 words; pages on the supplemental tier, each may contain more than 100 words. The primary tier may contain over 2500 words. For a normal daily written communication, this is adequate.

The supplemental tier contains the least frequently used words. From other angle of view, each page, indexed by one alphabet letter, gathered words sharing related meanings, includes three tiers, from the most frequently used word tier to the least frequently used word tier. Step 131 represents all 26 pages of the most frequently used words, to select between the pages, the user taps the alphabet letter keys on the keyboard with one hand and to select the words using the mouse with another hand. Every cell with a word therein is assigned with an address. For 100 words on one page, a two digit number is enough, one number of the column and one number of the row, is easy to handle. A word is addressed by the page alphabet and the column and row numbers thereof. When this process is familiarized by the user, who may key in the addresses to copy the words to the word processor, no need to display the pages on the screen. If a voice device is equipped, the user may call in the address for the word.

These privileged simple addresses are for the words on the default tier(pages) only. For the second tier, each address is pre-fixed with the number 2 before the alphabet of the page followed by the column number and the row number. Same rule applied to the supplement tier, but pre-fixed with the number 3. The user may key in these addresses to copy the associated words to the word processor, instead of displaying these tiers/pages on the screen. For example, a word in the primary tier, in a page led by letter "a", may have its address "a47". A less frequently used word in the same word group, classified into the secondary tier, may have its address "2a35". The "a" is for the simplified form, the equivalent traditional form counterparts of these words will occupy the addresses of "A47" and "2A35". A word in the supplemental tier of the same word group may have an address of "3a1209".

Pages within a tier is coplanar. Tiers are used for ranking words usage priorities, from the most frequently used to the least frequently used. Switching between the tiers is done by using the up/down keys on the keyboard. Groups are for arranging related meaning words, indexed from a to z. If a desired word is not in the primary tier, "page down" to the same group on the second tier, or further "page down" to the same group on the supplemental tier. The three tiers are not coplanar.

The step 131 is followed by step 132, if the desired word is located, as in the "Y" (yes) path, the word is copied to the word processor 140. Otherwise, as in the "N" (no) path, the user switch the page to its second tier, as indicated by step 133. If the desired word is located here as in the step 134 (Y) path, it is copied to the word processor 140. If the word is not located in the second tier (N), switching into the supplemental tier 135. The step 136 is same as step 134, if the word is located. However, if the word is not found, in step 137, this invention gives the user an opportunity to creat the desired word, which is then stored in the page of the tier in step 135.

This completed one word locating and selecting process. After the desired word is copied to the word processor 140, the user may select the next word in the same page, may switch to another page to locate it, step 141 indicates the choice of the user, if no idea of the index of the next word, return to the home page.

Figure 2:
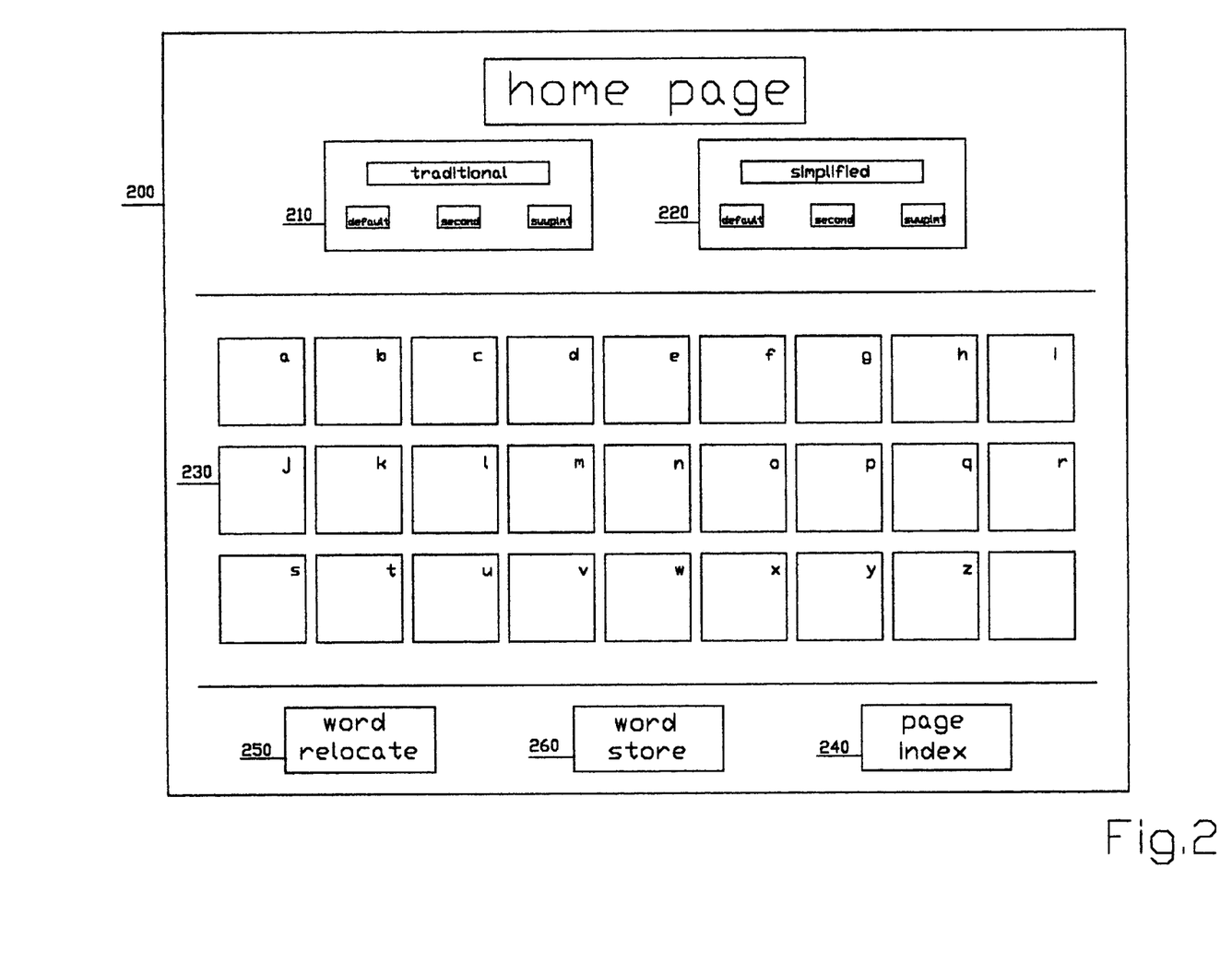
FIG. 2, the home page.

FIG. 2, illustrates the home page 200, showing the traditional 210 and the simplified 220 are identical in their format.

To find the equivalent word in the opposite structure, a user types in the address of the word, changes its capital form with the "Shift+Caps" keys. Or from this home page, selecting the page where the word located, a user returns to the home page to shift to the opposite structure to find the equivalent word. People, who is familiar with one form of words has difficulty to recognize words in the opposite form. Dictionaries usually list all the available words undiscriminatory, commingle words of these two forms. Other Chinese word processing programs are having all Chinese words mixed. For communicating formally in written language, to keep all words in an unified form is a good manner. The present invention offers the separation of these two forms. But finding the equivalent word is easy with this cross reference tool.

Within the areas of 210 or 220, three choices: default, second, supplement are listed for direct access to these three tiers. Without making the selections, the program automatically is in the default seting for the primary tier of vocabulary. Area 230 is a matrix of 27 keys for the index of the word pages, offering direct access to the word pages by pointing the cursor and click on them. The default seting is for the primary words. The 26 keys are indexed by the English alphabet letters on the keyboard, leaving the last one blank for additional expansion. To index the Chinese words for listing intelligently, for searching easily, is always a very challenging task for centuries. Until the present time, there is no perminant best solution for every one to satisfy. A principle of this invention is to utilize the existing equipment of a common personal computer, to use the 26 English letters for the indexing seems to be convenient. To classify the thousands of Chinese words into 26 groups, the best way seems to be gathering the words by their related meanings. The present invention classifies the word meanings into 23 groups led by letters from A to W, uses X,Y,Z for words difficult to classify, for special words and some very basic words. The words are arranged into these 23 groups by most basic elements of the universe, such as sun, moon, sky; earth, rock; domestic mammal; fish, water, boat; human, male, female; metal, tool, knife; measurement system; wood, bamboo. A person needs only a basic knowledge of these elements to directly lock into the related page to locate the desired Chinese words. The primary tier has most frequently used words, in most occations, these words are sufficient. This primary tier is the default seting. The second tier has less important words. The supplemental tier contains all words that are not listed in the other two higher priority tiers. This tier has no limit for listing. New words are added or created. Words may be relocated from other two tiers to this tier, or move out of. For the reason of no limit for word listing, the individual address in this tier is no limit to a two digit number. A modern Chinese word processor, such as the Microsoft Windows 98, has the ability to creat new words. This invention is intended to be a feature of a Chinese word processor. A modern Chinese word processor further offers a function of associated compound word, when a single word is entered. The punctuation marks are arranged as well.

Area 240 is a key leading to a detailed listing of all the pages. A new user will find it very handy to look up the indexes with all the word meaning groups as well as radicals they carriy. It is shown in FIG. 1 as step 121. Area 250 is a key leading to the word relocation process, detail given in FIG. 5.

FIG. 3 is a typical word processor display 300, with an inset window 310. Showing here is a page in the default tier of 100 primary words of the domestic mammals. Bar 311 is for a cursor to be landed and drag the inset window 310 to any location to yield the main window for word processing. The inset window 310 is floating automatically as the typing in progress. Four keys 312 are for the purpose of the following: (h) key for returning to home page, (+) key for enlargement of the inset window 310, (−) kay for reduction of it, (x) key for cancelling it.

Area 320 is the matrix of the vocabulary. The top row 321 is the ten Chinese numerals from 1 to 0. The left column 322 is the ten Arabic numerals from 1 to 0. Both of these numerals can be selected for word processing, as well as for indication of the column and row numbers for addressing the words, but are not assigned with addresses therefor. Words on this page are all related to domestic mammals, include: sheep, dog, pig, horse, cow, cat, rat, elephant and camel. Words listed here are either direct relatives of these mammals, such as "fox" and "wolf" are listed with "dog"; or words derived from these mammals, such as "drive" is listed with "horse", "plough" is with "cow". Interestingly, "monky" is here for the reason that it has the "dog" radical. In another page of "water, fish and boat", one will find that "whale" is listed for the same reason of having the "fish" radical, the ancient Chinese created this word long before the modern bio-science discovered that whale was not a fish. But whale lives with fish in water.

The top row of Chinese words in the window, ten of them in row 1, are all pronounced "Yang". There are more words with this same pronunciation. None of them shares similar meaning with others. An example of how complicated this language is.

The word occupies the address 11 (the one at the top left corner) is "oxygen". Listed here for the reason of having same pronuciation of "sheep", having the radical of "sheep". For the reason of having a co-radical of "air", it will be listed again in the page of "air, weather, atmosphere". For the reason of being a frequently used word, it will be listed in another primary page as well. This multiple listing of words is one of the main novelty of this invention contrast to traditional Chinese dictionaries and word processing programs. Words have no limit to be listed any number of times and any where within their form structure according to the desire and willingness of the user.

The alphabet letter 323 at the corner is the page index. Clicking at this letter to switch to the other two pages in this word group, to find the less frequently used words, or to return to the default page. As already mentioned, this letter is a part of the addresses for the words on this page. The alphabet letter keys of the keyboard are no longer for spelling the English words, instead, given a new use of indexing the word pages and for addressing the words thereof. An important feature is added to this program letting the user to relocate words. Detail is given in FIG. 5.

Figure 4:
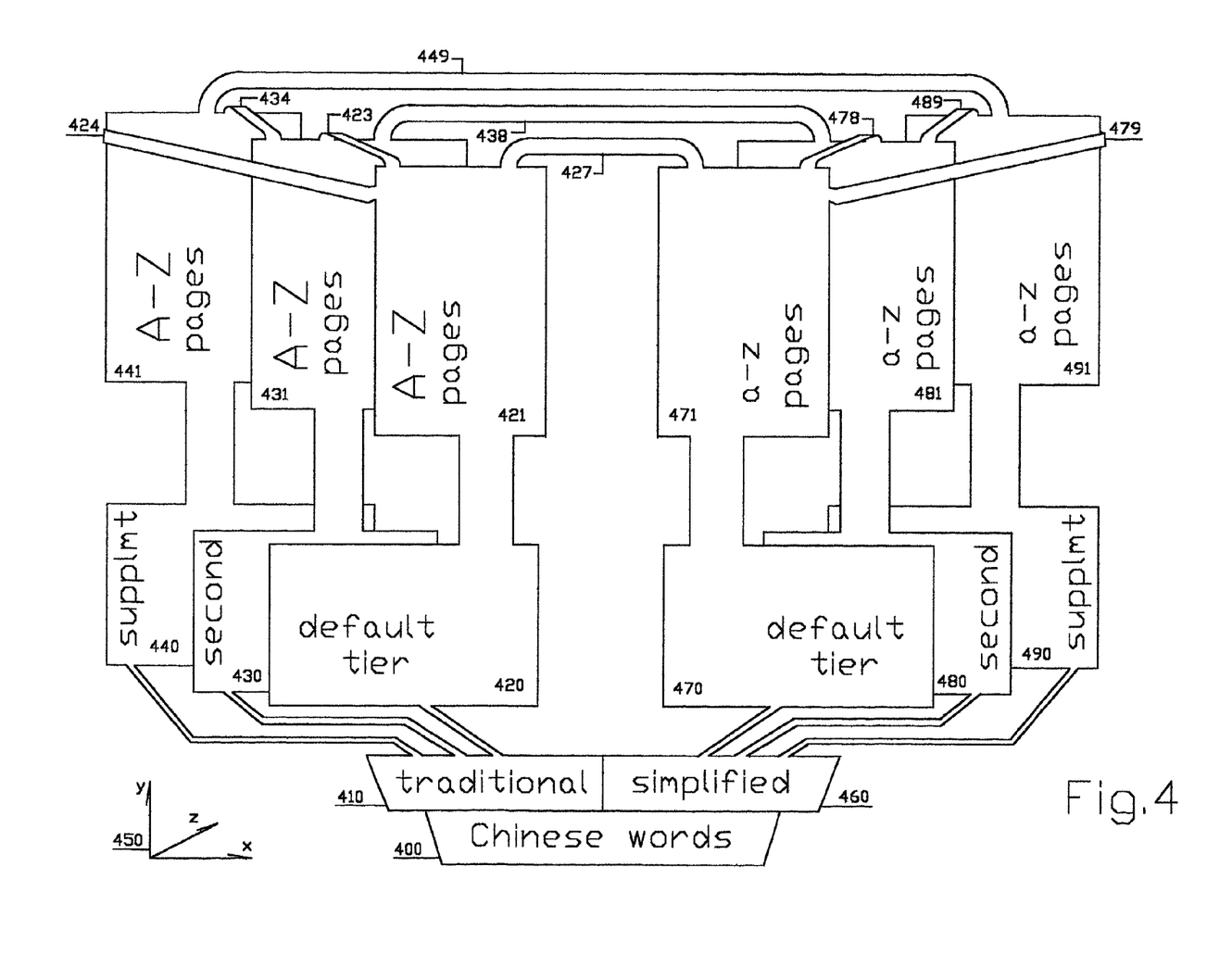
FIG. 4, the complete structure of the Chinese vocabulary storage system.

FIG. 4 illustrates the complete word organization 400 having two structure branches, the traditional 410 and the simplified 460. Every pair of corresponding components on these two structure branches is symmetrically collocated. This arrangement gives the user a very easy way to find the corresponding word in the opposite form.

The block 470 is the default tier, it is automatically selected for locating primary words. The block 471 shows a to z pages. The block 480 and 481 are second tier and pages, contains same number of pages as the primary tier. The block 490 and 491 are supplement tier and pages, contains no limit of words.

These tiers are not coplanar, but vertically arranged. A bridge 478 crosses from block 471 to block 481 indicates that words may be relocated between them. A bridge 489 crosses from block 481 to block 491 indicates that words may be relocated between them. A bridge 479 crosses from block 471 to block 491 indicates that words may be relocated between them.

The simplified structure's components are indexed with lower case of letters a to z. For the reason of being identical to each other, the traditional structure has same number of blocks and bridges as the simplified. The default tier and pages are 420 and 421. The second tier and pages are 430 and 431. The supplement tier and pages are 440 and 441. The bridges cross them are 423, 434, 424.

For cross reference between the two structure branches, bridges are arranged. For the reason of corresponding location of the equivalent words, bridges across the corresponding addresses in the corresponding pages only. That is a bridge across between two same alphabet letter indexed pages only (one page indexed with the upper case letter, the other page with the lower case letter) in a same level of tier.

On FIG. 4, bridge 427 crosses the pages 421 and 471 for the tiers 420 and 470; bridge 438 crosses the pages 431 and 481 for the tiers 430 and 480; bridge 449 crosses the pages 441 and 491 for the tiers 440 and 490. Again, for the reason of being correspondingly equivalent of the addresses and its occupants(words) in these two structures, if a word in one structure is relocated from one tier to another, the equivalent word in the other structure will be relocated automatically to comply with this principle.

To emphasize this three dimentional vocabulary arrangement, a x-y-z coordinate 450 is added at the corner. It is for an indication only. It has no value to the structure, is not a part of the invention.

Figure 5:
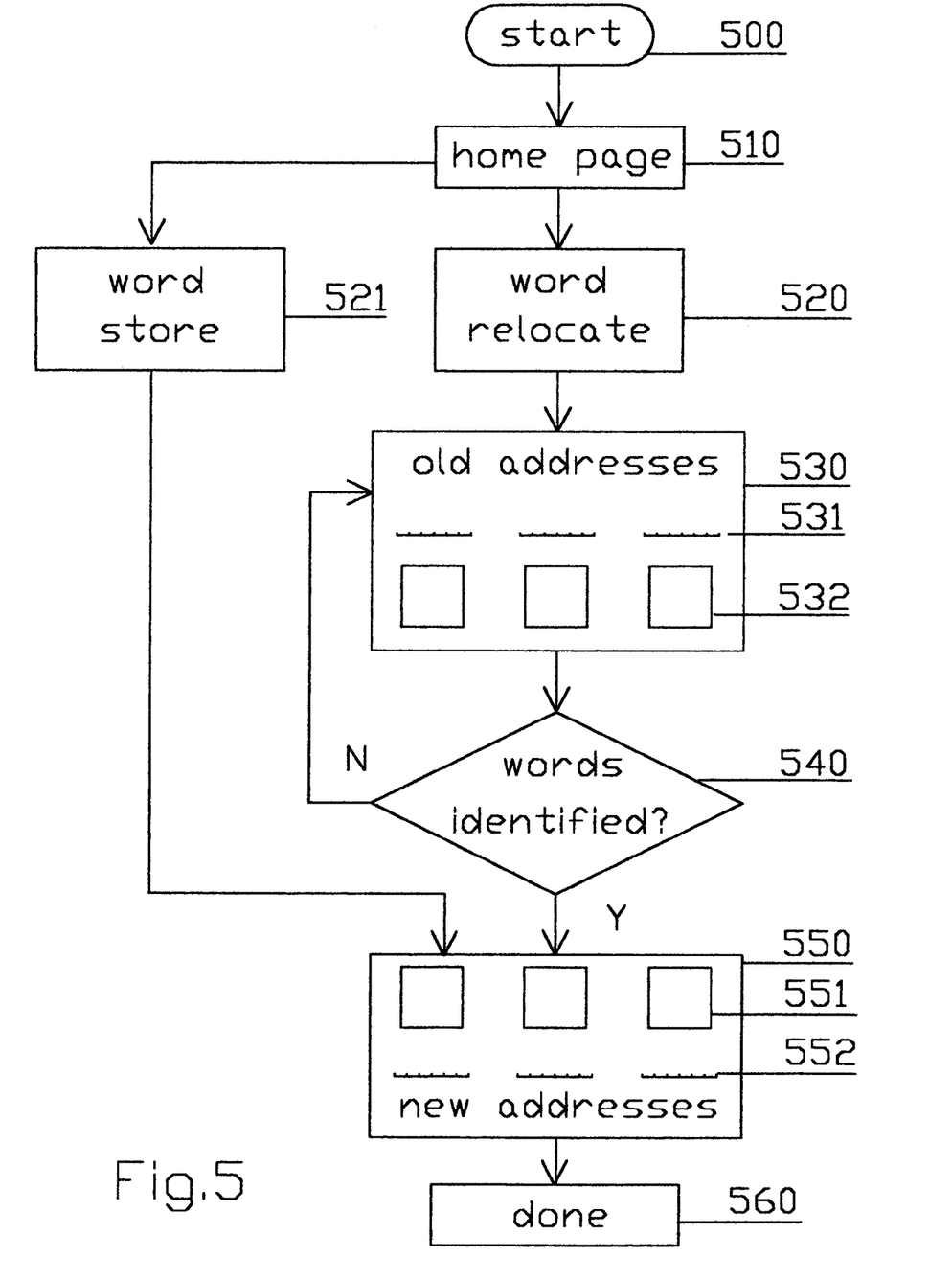
FIG. 5, the flow chart of word relocation.

FIG. 5 presents a routing of word relocation. At the starting 500, the home page 510 is shown on computer screen. The user click on the key 250 on the home page(FIG. 2) for selecting the "word relocate" 520, to display the old addresses window 530 onto the screen. Three address blanks 531 are available for up to three corresponding words to be relocated simultaneously. For words in the primary tiers, an address contains one alphabet letter followed by one digit column number and one digit row number; in the secondary tiers, an address contains one digit prefix number 2 followed by one letter, one digit column number and one digit row number; in the supplemental tiers, an address contains one digit prefix number 3 followed by one letter, column number (s) and row number(s). Each supplemental tier word page may have more than 100 words, needs two digit column number and two digit row number. Each address blank 531 has six digit space to be fully adequate for accommodation of a full length address.

The user enters the associating address of the word into the blank 531, hit Enter key of computer keyboard, the word will be delievered for identification. Choices are provided on step 540, if the word address is entered incorrectly, return to step 530 to repeat the process. If the word is the desired for relocation, as delieverd to the inset window 551 of new address window 550, the user proceeds to enter the new address(new location) of the word into blank 552. This relocation process is done 560, when Enter key is hit, the word and the address blinked.

I claim:

1. A Chinese vocabulary storage system for organizing, searching, accessing and selecting Chinese words on a computer device comprising:
    a plurality of word storage cells;
    each said word occupying one said cell;
    a plurality of word storage pages;
    each said page being distinguished by the content thereof;
    each said page having a plurality of said cells;
    each said word occupying one said cell within one said page;
    a plurality of said pages being displayed and accessed, wherein a plurality of said words are selected;
    a plurality of word storage structures being coupled by a reference linkage;
    each said structure having a plurality of said pages;
    each said structure having a plurality of said cells;
    each said word occupying at least one said cell within one said structure;
    each said structure having a plurality of communication passages between a plurality of said pages thereof;
    the traditional form of Chinese words occupying one said storage structure, the simplified form of Chinese words occupying another said storage structure;
    said structures being symmetrical;
    every component of one said structure having a corresponding counterpart in another said structure;
    each said word in one said structure having an equivalent meaning counterpart in another said structure;
    each said structure being in a three dimensional format, wherein priority of usage being in vertical order and the word groups being in horizontal order;
    said pages being connected by said communication passages, wherein said words being relocated to designated said cells within one said structure;
    said content being a plurality of said words and the symbols within each said page; and
    each said page containing a plurality of said words having at least one related meaning, having at least one related radical, having a same level of usage frequency priority; and
    wherein said computer device comprising:
        an internal memory for storing said Chinese words;
        a standard keyboard for indexing said pages, for switching between said word forms, for typing said addressess;
        a screen for displaying said pages in sequence; and
        a pointing device for selecting a string of said words, accessing to a Chinese word processor program, whereby said words are organized, searched and processed.

2. The system of claim 1, further comprising:
    each said component of said structures being assigned sequence numbers, alphabet indexes, column numbers and row numbers respectively;
    each said cell having an individual address combining said sequence number, said alphabet index, said column number and row number;
    said reference linkage providing cross reference of said words between said traditional form and said simplified form;
    each said structure having said words arranged from most frequently used to least frequently used; and
    said pages storing said words most frequently used being arranged as default pages with highest displaying and accessing priority.

3. The system of claim 1, further comprising:
    said equivalent meaning counterpart being the same meaning and opposite form of said words of said traditional form and said simplified form;
    said related meanings and said related radicals being said words sharing related social and natural elements;
    each said pages displaying on the computer screen as a floating window.

* * * * *